US008898203B2

(12) United States Patent
Leland et al.

(10) Patent No.: US 8,898,203 B2
(45) Date of Patent: Nov. 25, 2014

(54) GENERATING A SEPARABLE QUERY DESIGN OBJECT AND DATABASE SCHEMA THROUGH VISUAL VIEW EDITING

(75) Inventors: Maureen G. Leland, Bolton, MA (US); Brian J. Levine, Chelmsford, MA (US); David Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 1546 days.

(21) Appl. No.: 11/318,679

(22) Filed: Dec. 27, 2005

(65) Prior Publication Data
US 2007/0156740 A1     Jul. 5, 2007

(51) Int. Cl.
*G06F 17/30*     (2006.01)

(52) U.S. Cl.
CPC ....... *G06F 17/30395* (2013.01); *Y10S 715/968* (2013.01)
USPC .......................................... 707/805; 715/968

(58) Field of Classification Search
None
See application file for complete search history.

(56) References Cited

U.S. PATENT DOCUMENTS

| 5,675,785 A | 10/1997 | Hall et al. |
| 5,768,578 A | 6/1998 | Kirk et al. |
| 5,899,991 A | 5/1999 | Karch |
| 5,950,190 A * | 9/1999 | Yeager et al. ........................ 1/1 |
| 6,915,298 B1 | 7/2005 | Cain et al. |
| 2003/0120711 A1* | 6/2003 | Katz ............................. 709/106 |
| 2004/0210445 A1 | 10/2004 | Veronese et al. |
| 2007/0079282 A1* | 4/2007 | Nachnani et al. ............. 717/106 |

FOREIGN PATENT DOCUMENTS

JP     8016438     1/1996

OTHER PUBLICATIONS

Auddino et al., entitled "SUPER: A Comprehensive Approach to Database Visual Interfaces", Visual Database Systems, II. IFIP TC2/WG2.6, Second Working Conference. Sep. 1991.

* cited by examiner

Primary Examiner — Anh Tai Tran
(74) Attorney, Agent, or Firm — Steven M. Greenberg, Esq.; CRGO Law

(57) ABSTRACT

Embodiments of the present invention address deficiencies of the art in respect to database driven collaborative applications and provide a novel and non-obvious method, system and computer program product for generating a separable query design object and database schema through visual view editing. In one embodiment, an application generation method can be provided. The method can include creating a form for a collaborative application, placing a data source user interface control within the form and binding at least one field of a database query result set to the data source user interface control. Finally, the method can include storing a database query for the result set separately from the form.

13 Claims, 2 Drawing Sheets

GENERATING A SEPARABLE QUERY DESIGN OBJECT AND DATABASE SCHEMA THROUGH VISUAL VIEW EDITING

BACKGROUND OF THE INVENTION

1. Field of the Invention

The present invention relates to the field of database query operations in a visual interface and more particularly to the visual construction and use of a database query operation in a visual interface.

2. Description of the Related Art

Database driven computing applications have formed the foundation of practical, enterprise computing for decades. Database driven computing applications relate to the free access by application logic of data stored and managed by a database management system. In this regard, in a database driven computing application, the application developer needn't worry about the fundamentals of data management, while the database architect needn't worry about the fundaments of application logic. Rather, each can focus on their respective responsibilities. Consequently, the marriage of data storage and management, and application logic has resulted in a voluminous collection of database driven computing applications providing advancements in industrial productivity far beyond that known prior to the age of personal computing.

Collaborative applications have capitalized on the effective nature of database driven computing. In a collaborative application, a group of collaborating end users can convene in a collaborative space defined by a computing application in order to share access to collaborative documents and communications. Exemplary collaborative documents include documents revealed through application sharing and documents revealed through shared libraries. Likewise, exemplary collaborative messages include chat threads and electronic mail. A well-known and extraordinarily popular collaborative application includes the Lotus™ Workplace™ database driven computing application manufactured by International Business Machines (IBM) Corporation of Armonk, N.Y., United States. (Lotus and Workplace are registered trademarks of IBM Corporation).

Due to the centralized focus of collaborative applications upon collaborative data, database access remains an integral part of collaborative computing. Generally, developing a collaborative workspace in a collaborative application requires the design of a visual user interface including the specification of one or more user interface controls in the visual user interface. The user interface controls often include a view to a result set from a database query, through the specification of one or fields for records in the result set. The database query, itself, often can be specified separately by the database developer.

To facilitate the independent development of customized collaborative applications by end users, advanced collaborative computing environments like Lotus Workplace permit end users to specify a desired database query through the design module for designing the visual interface. In Lotus Workplace, for instance, the design module is known as the Lotus Workplace Designer™. As the end user establishes a user interface control intended to reveal portions of a database query result set, the end user can visually specify the database query utilizing wizard-like technology as it is understood in the art. Consequently, the end user need not have a command of database programming languages such as the structured query language (SQL) in order to effectively develop a collaborative application.

While the visual development of a collaborative space incorporating one or more database queries can provide an ease of use experience for even the least sophisticated end user, the ease of use experience comes at a price. Specifically, to provide for the visual specification of a database query in a visual view for a collaborative space requires the embedding of the database query in the definition for the visual view. As a result, the embedded database query defined for each control in the visual view cannot be reused in different visual views. Accordingly, although the visual specification of the database query provides the advantage of ease of use, the visual specification of the database query lacks extensibility.

BRIEF SUMMARY OF THE INVENTION

Embodiments of the present invention address deficiencies of the art in respect to database driven collaborative applications and provide a novel and non-obvious method, system and computer program product for generating a separable query design object and database schema through visual view editing. In one embodiment, an application generation method can be provided. The method can include creating a form for a collaborative application, placing a data source user interface control within the form and binding at least one field of a database query result set to the data source user interface control. Finally, the method can include storing a database query for the result set separately from the form.

In one aspect of the invention, placing a data source user interface control within the form can include dragging and dropping a data source user interface control within the form. Additionally, placing a data source user interface control within the form, further can include adding a visual column to the data source user interface control. In another aspect of the invention, binding at least one field of a database query result set to the data source user interface control can include binding the visual column to an existing field in the result set, or to a new field in the result set. Finally, the method can include specifying selection criteria for the result set, and generating the database query for the specified selection criteria and the added visual column.

In another embodiment of the invention, a collaborative application designer data processing system can include an end user computing platform configured with a collaborative application designer, at least one data source communicatively coupled to the end user computing platform, and a collaborative application generated by the collaborative application designer. The collaborative application can include view elements and separate database query elements. The view elements can include data source user interface controls bound to corresponding result sets for respective ones of the database query elements. Additionally, the collaborative application further can include separate database schema for the result sets.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for generating a separable query design object and database schema from a visual view for a collaborative application. In accordance with an embodiment of the present invention, a visual view can be generated in a collaboration application designer. The visual view can include a user interface control configured to present at least a portion of a result set for a database query. Importantly, a database query object can be constructed within the visual view to produce the result set for the database query for presentation in the user interface control. Yet, though the database query object can be constructed within the visual view, the database query object can be stored separately from the visual view. In this way, the database query object can be accessed and edited separately from the visual view.

Figure 1:
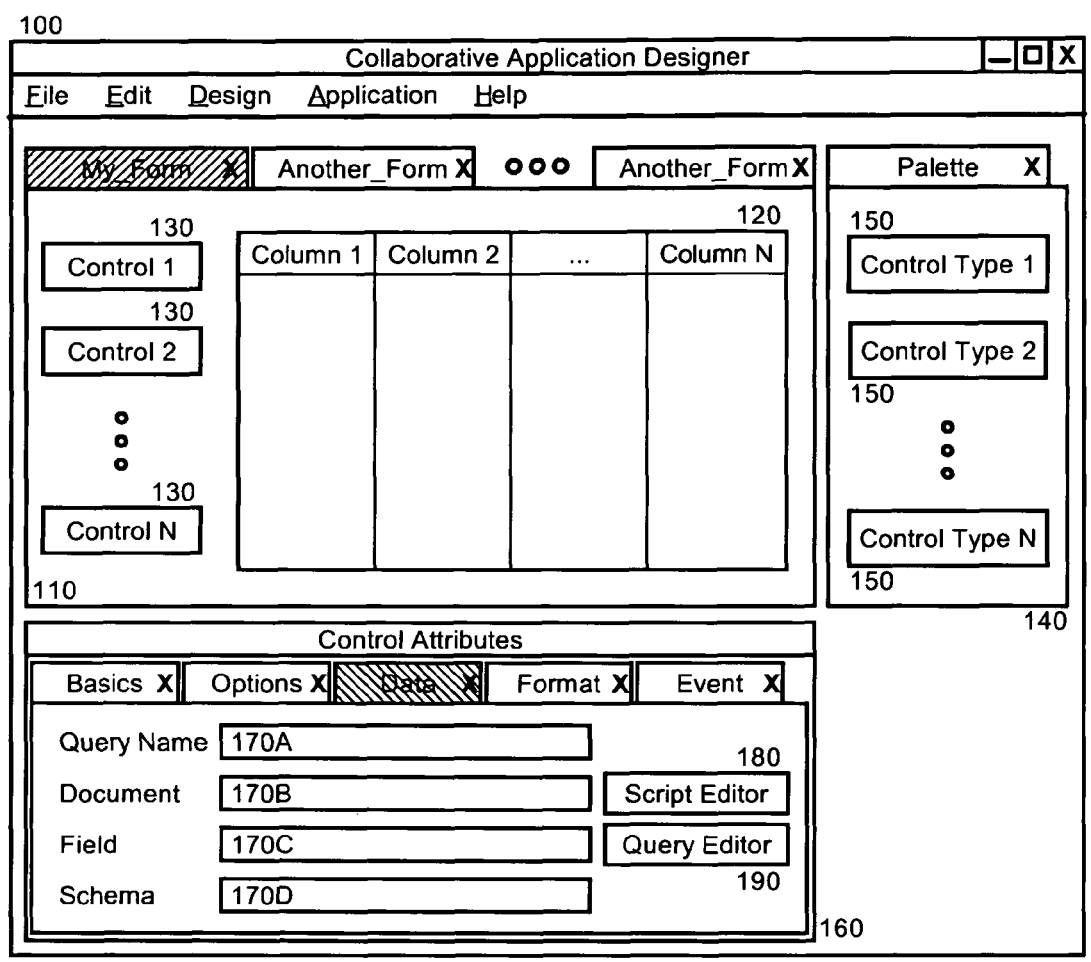
FIG. 1 is a pictorial illustration of a collaboration application designer enabled for generating a separable query design object from a visual view generated within the collaboration application designer.

In more particular illustration, FIG. 1 is a pictorial illustration of a collaboration application designer enabled for generating a separable query design object from a visual view generated within the collaboration application designer. The collaboration application designer 100 can provide for the creation and modification of one or more forms 110, each tabularly selectable within the collaboration application designer 100. Each of the forms 110 can define a visual view for a collaborative application. Each of the forms 110 further can include one or more user interface controls 130 which can be established within the visual view by dragging and dropping a corresponding control type 150 from a user interface control palette 140 in the collaboration application designer 100.

A data source user interface control 120 can be included among the user interface controls 130. As such, control attributes 160 can be specified for the data source user interface control 120 within the collaboration application designer 100. The control attributes 160 can include basic attributes, optional attributes, formatting attributes, event attributes and data binding attributes. With respect to the latter attribute, a query object can be defined to produce a result set for rendering in the data source user interface control 120.

The query object can be assigned a query name 170A, document 170B, field 170C within the result set, and a schema 170D. In this regard, a field 170C within the result set can be bound to the data source user interface control 120 for presentation through the data source user interface control 120. Advantageously, either an existing field or a newly defined field in the result set can be bound to the data source user interface control 12. As shown in FIG. 1, a script editor 180 can be invoked for editing a script for selecting the specified document 170B. Likewise, a query editor 190 can be invoked for editing the query object itself.

Figure 2:
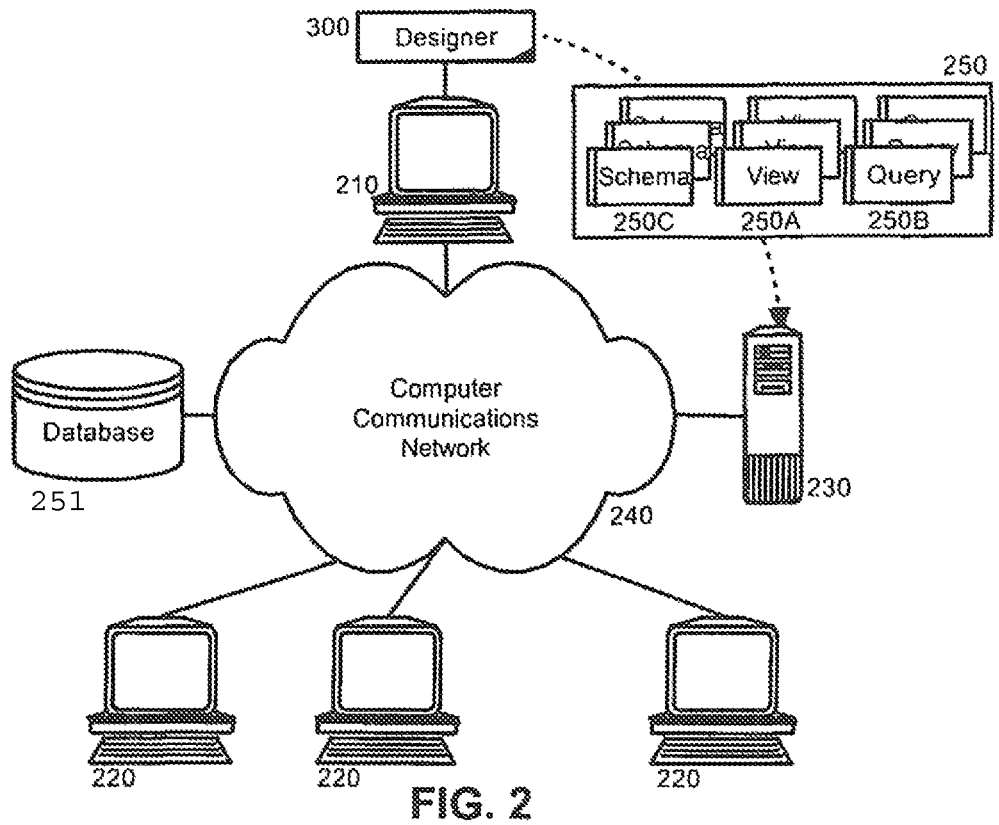
FIG. 2 is a data processing system for generating a separable query design object from a visual view generated within a collaboration application designer; and, FIG. 3 is a flow chart illustrating a process for generating a separable query design object from a visual view generated within a collaboration application designer.

The collaborative application designer 100 can be disposed within a data processing system. For instance, FIG. 2 is a data processing system for generating a separable query design object from a visual view generated within a collaboration application designer. The data processing system can include an end user computing platform 210 configured to host a logical instance of a collaborative application designer 300. The end user computing platform 210 can be communicatively coupled to one or more collaborative client computing devices 220 over a computer communications network 240. Moreover, the end user computing platform 210 can be communicatively coupled to a collaborative application server 230 and at least one data source (database) 251 over the computer communications network 240.

The collaborative application designer 300 can be configured to generate a collaborative application 250. The collaborative application 250 can include separate views 250A for different results sets produced by different database queries disposed in separately stored database query objects 250B. Each of the separately stored database query objects 250B further can conform to corresponding separate database schema objects 250C. In as much as the database query objects 250B are stored separately from the corresponding view objects 250A, the database query objects 250B can be individually edited using a tool external to the collaborative application designer 300.

Figure 3:
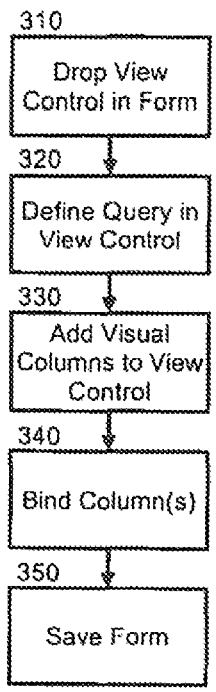

In particular illustration of the operation of the collaborative application designer 300, FIG. 3 is a flow chart illustrating a process for generating a separable query design object from a visual view generated within a collaboration application designer. Beginning in block 310, a view control can be dropped into a form in the collaborative application designer. In block 320, a database query can be defined for the view control. In this regard, a set of selection criteria can be specified for a result set to result from the definition and execution of a database query. The result set can include of one or more records, each having one or more fields, any one of which can be presented in the view control.

In block 330, one or more columns can be added to the view control, each column having a configuration for presenting a field in a result set produced by the database query. In block 340, the column or columns can be bound to either a new field defined for the result set, or an existing field previously defined for the result set. Finally, in block 350, the form can be saved for use in the collaborative application. Once the form is saved, the form can be traversed by the collaborative application designer to produce markup to represent the view. The form subsequently can be traversed either to create a new database schema for the fields of the result set bound to the columns of the control, or to modify an existing schema for the same purpose. Finally, the form can be traversed yet again to generate a separate database query element for the selection criteria and defined columns in the form.

In consequence of the separability of the database query design element from the form, the query design element can be reused across many different forms defined within the collaborative application designer. Moreover, the database query design element can be modified for use in different forms defined with the collaborative application designer. Of course, the database query design element further can be edited in a tool separate from the collaborative application designer. Finally, the schema generated for the database query design element can be used in new forms as well. Consequently, the separability of the database query design element can produce a greater degree of extensibility not present where the database query design element is stored integrally with the view element.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain, store, communicate, or transport the program for use by or in connection with the instruction execution system, apparatus, or device. The storage medium can be an electronic, magnetic, optical, electromagnetic, infrared, or semiconductor system (or apparatus or device). Examples of a computer-readable (usable) storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. With specific reference to a computer usable (readable) storage medium, it is to be understood that a storage medium excludes transitory media such as transitory signals and other propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A collaborative application generation method comprising:
    creating a form for a collaborative application;
    placing a data source user interface control within the form;
    binding at least one field of a database query result set comprising a set of records of a database resulting from a database query to the data source user interface control by defining a query object, the query object is assigned a query name, a document, at least one field of the database query result set, and a schema; and,
    storing the database query for the database query result set separately from the form.

2. The method of claim 1, wherein placing the data source user interface control within the form, comprises dragging and dropping a data source user interface control within the form.

3. The method of claim 1, wherein placing the data source user interface control within the form, further comprises adding a visual column to the data source user interface control.

4. The method of claim 3, wherein binding at least one field of the database query result set to the data source user interface control, comprises binding the visual column to an existing field in the database query result set.

5. The method of claim 3, wherein binding at least one field of the database query result set to the data source user interface control, comprises binding the visual column to a new field in the database query result set.

6. The method of claim 3, further comprising:
    specifying selection criteria for the database query result set; and,
    generating the database query for the specified selection criteria and the added visual column.

7. A collaborative application designer data processing system comprising:
    an end user computing platform configured with a collaborative application designer;
    at least one data source communicatively coupled to the end user computing platform; and,
    a collaborative application generated by the collaborative application designer, the collaborative application comprising a plurality of view elements and separately stored database query elements, the plurality of view elements comprising data source user interface controls bound to corresponding result sets for respective ones of the database query elements by defining a query object, the query object is assigned a query name, a document, at least one field of the corresponding result sets for respective ones of the database query elements and a database schema, the results sets each comprising a set of records of a database resulting from a database query.

8. A computer program product comprising a computer usable storage medium having computer usable program code for collaborative application generation, the computer program product including:
    computer usable program code for creating a form for a collaborative application;
    computer usable program code for placing a data source user interface control within the form;
    computer usable program code for binding at least one field of a database query result set comprising a set of records of a database resulting from a database query to the data source user interface control by defining a query object, the query object is assigned a query name, a document, at least one field of the database query result set, and a schema; and,
    computer usable program code for storing the database query for the database query result set separately from the form.

9. The computer program product of claim 8, wherein the computer usable program code for placing the data source user interface control within the form, comprises computer usable program code for dragging and dropping a data source user interface control within the form.

10. The computer program product of claim 8, wherein the computer usable program code for placing the data source user interface control within the form, further comprises computer usable program code for adding a visual column to the data source user interface control.

11. The computer program product of claim 10, wherein the computer usable program code for binding at least one field of the database query result set to the data source user interface control, comprises computer usable program code for binding the visual column to an existing field in the database query result set.

12. The computer program product of claim 10, wherein the computer usable program code for binding at least one field of the database query result set to the data source user interface control, comprises computer usable program code for binding the visual column to a new field in the database query result set.

13. The computer program product of claim 10, further comprising: computer usable program code for specifying selection criteria for the database query result set; and, computer usable program code for generating the database query for the specified selection criteria and the added visual column.

\* \* \* \* \*